United States Patent [19]
Ratcliffe et al.

[11] Patent Number: 5,274,943
[45] Date of Patent: Jan. 4, 1994

[54] INDICATING DEVICE FOR FISHING RODS

[75] Inventors: Michael P. Ratcliffe, Mississauga; Ralph D. Ratcliffe, Oakville; Timothy R. Ratcliffe; Wayne A. Ratcliffe, both of Mississauga, all of Canada

[73] Assignee: Lure Lite Incorporated, Oakville, Canada

[21] Appl. No.: 967,056

[22] Filed: Oct. 28, 1992

[51] Int. Cl.⁵ .............................................. A01K 85/01
[52] U.S. Cl. ............................................................ 43/17
[58] Field of Search ...................... 43/17, 16, 17.5, 17.1

[56] References Cited

U.S. PATENT DOCUMENTS

| | | | |
|---|---|---|---|
| 1,541,724 | 6/1925 | McElree | 43/17 |
| 2,001,109 | 5/1935 | Petrie | 43/17 |
| 2,280,457 | 5/1942 | Sutcliffe | 43/17 |
| 3,882,629 | 5/1975 | Kaye | 43/17 |
| 3,918,191 | 11/1975 | Williamson | 43/17 |
| 4,399,630 | 8/1983 | Lawes | 43/17 |
| 4,399,631 | 8/1983 | Smith | 43/17 |
| 4,458,437 | 7/1984 | Ou | 43/17 |
| 4,458,438 | 7/1984 | McCulley | 43/17 |
| 4,479,321 | 10/1984 | Welstead | 43/17 |
| 4,590,701 | 5/1986 | Rivers | 43/17 |
| 4,766,688 | 8/1988 | Hiles | 43/17 |
| 5,125,181 | 6/1992 | Brinton | 43/17 |

FOREIGN PATENT DOCUMENTS

| | | | |
|---|---|---|---|
| 1040605 | 10/1987 | Canada | 240/64 |
| 1296452 | 5/1969 | Fed. Rep. of Germany | 43/17 |
| 3200728 | 7/1983 | Fed. Rep. of Germany | 43/17 |

Primary Examiner—Richard K. Seidel
Assistant Examiner—James Miner
Attorney, Agent, or Firm—Donald E. Hewson

[57] ABSTRACT

An electrically powered indicating device for use in conjunction with a fishing rod is disclosed. The device indicates when the end of the fishing rod remote to the handle is pulled downwardly and distinguishes between a fish nibbling at the hook on the fishing line and a fish caught on the hook of the fishing line. The device comprises a protective housing, an electrical power source, such as a battery, an electrically powered indicating means such as a light emitting diode or buzzer, and a non-positive contact switch means such as a mercury tilt switch, all electrically connected in series with one another. When the device becomes tilted past a certain orientation, the non-positive switch means becomes closed, thus turning on the indicating means. When the non-positive contact switch means is closed and the device is moved abruptly or vigorously, the non-positive contact switch means becomes opened and closed intermittently. It is thereby possible to distinguish between a fish nibbling on a hook and a fish that is caught on a hook.

16 Claims, 4 Drawing Sheets

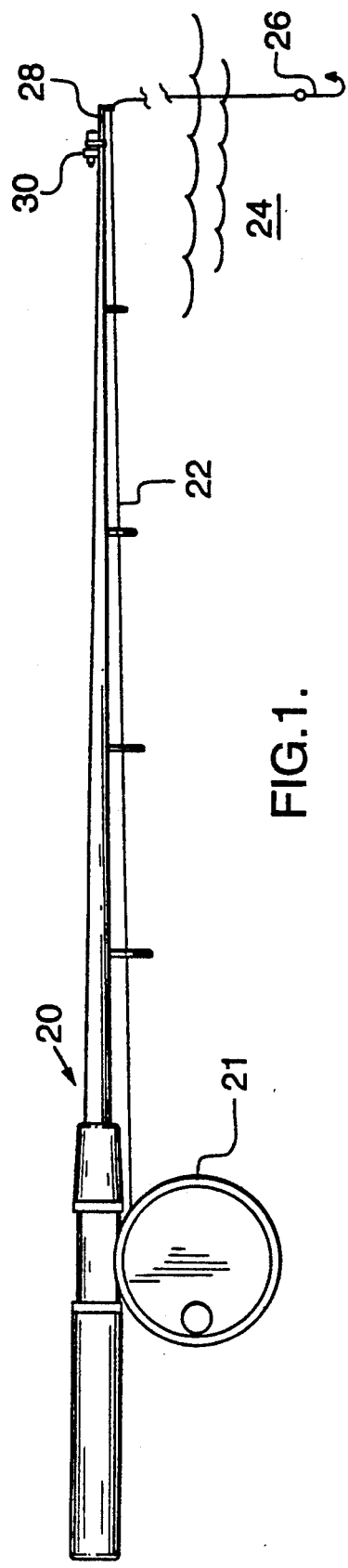
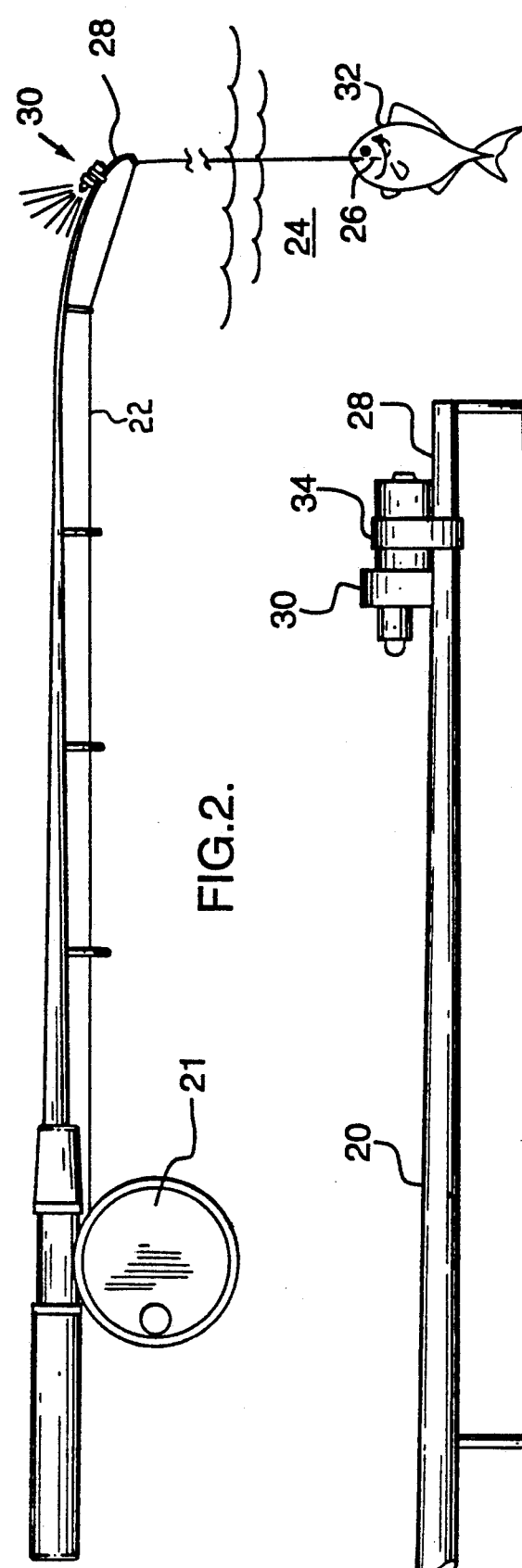
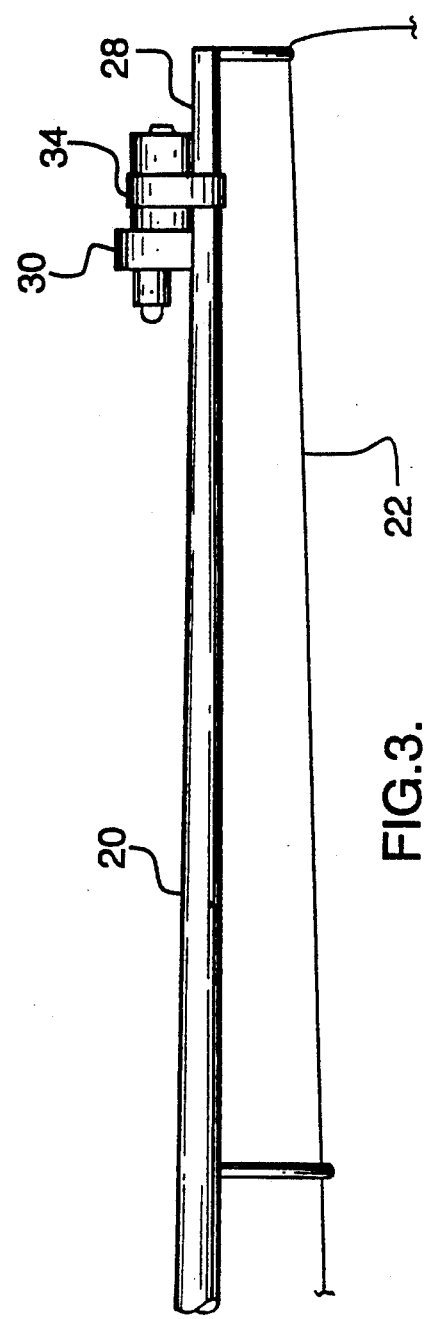
FIG.1.
FIG.2.
FIG.3.

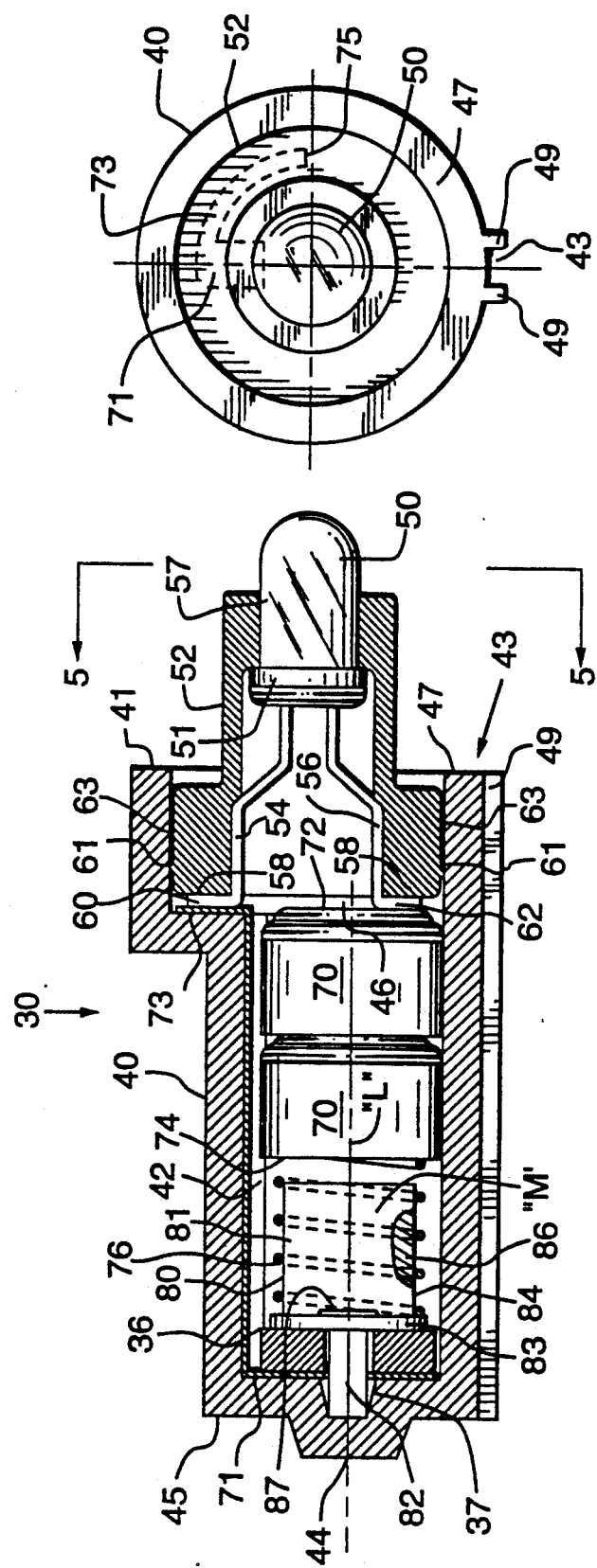
FIG.5.
FIG.4.
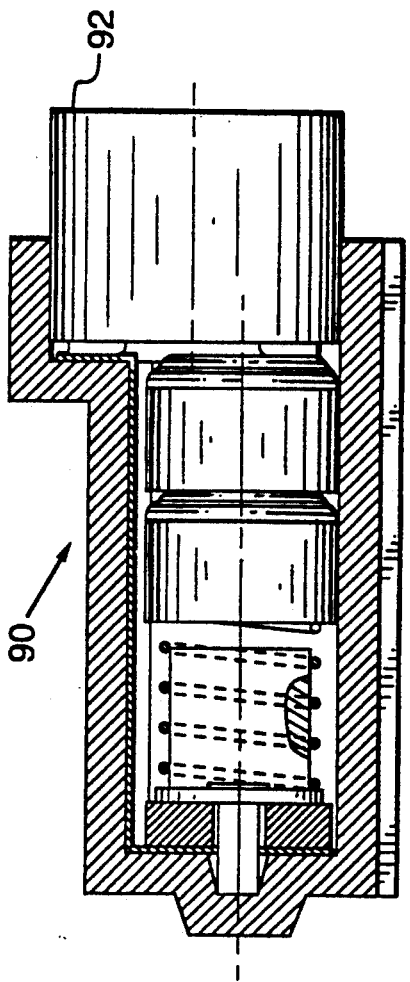
FIG.8.

INDICATING DEVICE FOR FISHING RODS

FIELD OF THE INVENTION

This invention relates to fishing rods and more particularly to devices to be used in conjunction with fishing rods. Specifically, an electrically powered indicating device is disclosed.

BACKGROUND OF THE INVENTION

Sport fishing is a very popular recreational pastime and is usually performed in a very relaxed manner. Often, a person fishing will sit back and rest or generally socialize with other people that might be fishing with him, and not pay close attention to the fishing rod. It is, however, necessary to know when one is fishing, whether a fish is biting at the hook or has even been caught by the hook. This is typically done in one of two ways. The person fishing can hold onto the fishing rod and through tactile senses tell when the fishing rod moves, or alternatively the person can hear when the fishing line suddenly starts to unravel from the fishing rod. Often, a person fishing does not want to make the effort to continuously hold the fishing rod. Further, if a fish is only nibbling at the hook the line might not be unraveling noticeably. It is very common for a person fishing to merely sit back at a distance from the fishing rod and wait for some sort of indication that a fish is nibbling on the hook or has been fully caught on the hook. It would therefore be desirable to be able to tell from a distance when a fish is nibbling at or is caught on the hook.

It is also possible that a person fishing might have more than one fishing rod in use at any given time depending on local laws or regulations. This may also occur when a person is fishing with someone such as a child who might need assistance with a fishing rod. In any event, it may be desirable for a person to have a means to monitor other fishing rods to determine whether a fish is perhaps nibbling or has been caught on the hook.

It is useful to be able to tell when a fish might be nibbling at a hook as opposed to actually being caught on a hook, because the actions required to ultimately land a fish that might be nibbling at a hook and one that is actually caught on the hook are quite different. A fish that is nibbling on a hook may be ultimately hooked by pulling on the fishing line slightly to further attract the fish or to actually hook the fish. If it is believed that a fish has actually been caught on the hook, then the line is either reeled in quickly or is allowed to be pulled out by the fish, at the discretion of the person fishing. In any event, it is necessary to treat each type of situation separately. It is therefore desirable to be able to tell when a fish is nibbling at a hook and also when a fish has been caught on the hook.

Another situation wherein it is possibly even more desirable to be able to tell when a fish is either nibbling at a line or actually caught on the hook is during night fishing. It is difficult, however, to monitor one or more fishing lines, especially remotely, in the dark. It is especially difficult in the dark to discern whether a fish is nibbling at the hook of the line or whether the fish has been caught. It would be desirable to be able to remotely monitor one or more fishing rods in the dark.

It is an object of the present invention to provide an indicating device that permits a person fishing to remotely monitor the status of the fishing rod.

It is another object of the present invention to provide a monitoring device to allow a person fishing to remotely monitor a plurality of fishing rods.

It is yet another object of the present invention to allow a person fishing to remotely discern between a fish nibbling at the hook of the fishing line and a fish caught on the hook of the fishing line.

It is a further object of the present invention to provide a monitoring device to allow a person fishing to monitor the status of a fishing rod in the dark.

PRIOR ART

It is known to have an electrically activated device located on the end of a fishing rod, which device basically contains a battery, a light, and a mercury switch. When the end of the fishing rod is pulled down by tension on the fishing line as caused either by a fish caught on the hook or by a fish nibbling on the hook, the angle of orientation of such a prior art device changes so that the mercury switch closes and turns the light on. The light remains on steadily, however, until the tension on the fishing line is no longer present. It is not possible to discern the difference between a fish nibbling on the hook and a fish that has been caught on the hook.

A typical example of such a prior art device is disclosed in Canadian Patent 1,040,605 to Kaye, which discloses a Bite Signaling Light Attachment for Fishing Rods. This attachment has an elongated casing with a positive contact mercury switch, a battery, and a light bulb electrically connected in series. The mercury switch and the battery are fully enclosed by the casing. The light bulb projects outwardly from the proximal end of the casing, which faces the person holding the fishing rod. The attachment is secured to the end of a fishing rod distant from the handle such that the elongated casing is angled upwardly towards its distal end, which is the end that faces away from the person holding the fishing rod. When the fishing line is pulled on, thus pulling down the end of the rod, the attachment rotates past a horizontal orientation and thus becomes angled downwardly at its distal end. The mercury switch becomes closed thereby completing the circuit and illuminating the light bulb. The mercury switch remains closed until the distal end of the attachment is rotated generally in a reverse direction past horizontal—that is, until the distal end of the attachment is again angled upwardly. It can be seen that once the switch is turned on by a fish pulling on the fishing line and bending the end of the rod downwardly, it will generally not turn off until the rod is again oriented upwardly. It is virtually not possible to tell when a fish is nibbling at the hook on the line as compared to actually having been caught by the hook.

SUMMARY OF THE INVENTION

An electrically powered indicating device for use in conjunction with a fishing rod to indicate movement of a portion of the fishing rod, is disclosed. The device comprises a protective housing having a generally hollow interior, a first datum point, a second datum point, and a first longitudinal axis passing through the first and second datum points. An electrical power source having a first terminal and a second terminal is securely retained within the interior of the protective housing.

An electrically powered indicating means is securely retained by the protective housing, the indicating means having a first lead and a second lead. There is a non-positive contact switch means electrically connected in series with the electrical power source and the electrically powered indicating means for turning on and off the electrically powered indicating means. The non-positive contact switch means has a generally hollow interior having a first end, a second end, and a second longitudinal axis generally centrally aligned within the hollow interior; a first terminal and a second terminal, with at least the first terminal disposed near the first end of the generally hollow interior; and a terminal bridge member adapted to contact the first and second terminals so as to thereby connect the first and second terminals in electrically conductive relation with each other. The terminal bridge member can move within the hollow interior of the non-positive contact switch means in a direction that is, at least in part, perpendicular to the longitudinal axis so as to alternatingly connect the first and second terminals in electrically conductive relation with each other, and subsequently alternatingly make and break the connection upon vigorous and abrupt movement of the non-positive contact switch means in a direction that is at least in part perpendicular to the second longitudinal axis such that the non-positive contact switch means becomes correspondingly opened and closed intermittently. The electrical power source, the electrically powered indicating means, and the switch means are in a complete electrical circuit, and the electrically powered indicating means is energized by the electrical power source when the switch means is closed. The non-positive contact switch means initially becomes closed when the device is oriented such that the first datum point is lower than the second datum point. Subsequently to the non-positive contact switch means initially becoming closed, the non-positive contact switch means may become opened and closed intermittently upon abrupt vigorous movement of the device.

BRIEF DESCRIPTION OF THE DRAWINGS

Embodiments of the present invention will now be described by way of the accompanying drawings, in which:

FIG. 1 is a pictorial representation of the indicating device of the present invention attached to the end of a fishing rod with the fishing rod in a straight configuration, corresponding to not having a fish on the hook of the fishing line;

FIG. 2 is a pictorial representation of the fishing rod of FIG. 1 in a bent configuration, corresponding to having a fish either nibbling on or hooked on the hook of the fishing line;

FIG. 3 is an enlarged view of a portion of FIG. 1 with the indicating device of the present invention attached to the end of a fishing rod by an elastic member;

FIG. 4 is a sectional view of the indicating device of FIG. 1 having a light emitting diode as the indicating means;

FIG. 5 is an end view of the indicating device of FIG. 6, along lines 6—6;

FIG. 8 is a sectional view of an alternative embodiment of the indicating device of the present invention, having a buzzer as the indicating means.

DETAILED DESCRIPTION OF THE PREFERRED EMBODIMENTS

Figure 6:
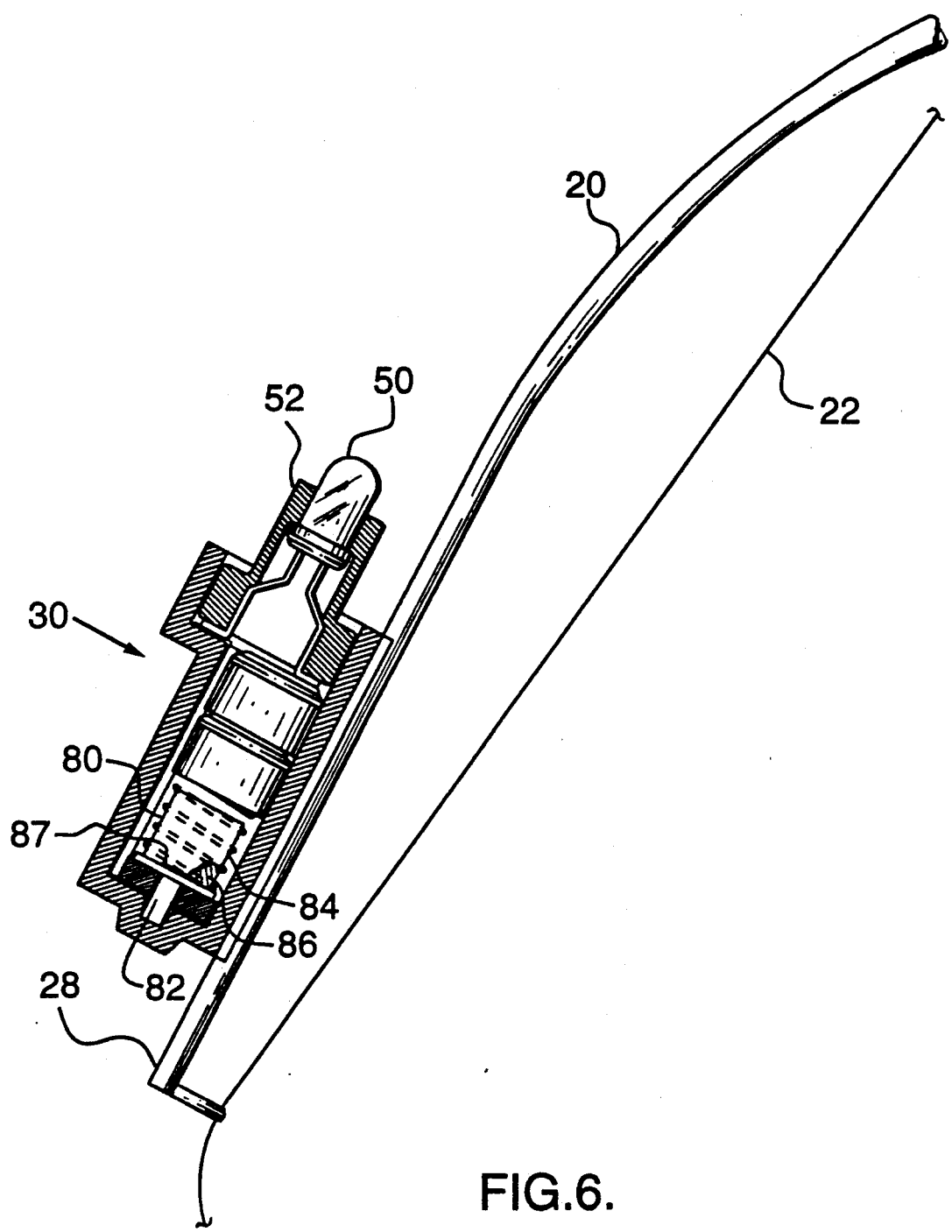
FIG. 6 is an enlarged pictorial side view of the end of the fishing rod and indicating device as shown in FIG. 2.

Reference will now be made to FIGS. 1 and 2 which show a fishing rod 20 in use with the fishing line 22 thereon extending into water 24 and terminating at a hook 26. Alternatively, a lure could be attached to the fishing line 22, with the lure having at least one hook thereon. Securely attached to the distal end 28 of the fishing rod 20 is the indicating device 30 of the present invention. The size of the indicating device 30 is about one and one-half inches in length and about one-half inch in diameter. As can be seen in FIG. 1, the hook 26 does not have a fish nibbling thereat nor does it have a fish caught thereon. Resultingly, the fishing line 22 remains dormant with no tension on it, except for the weight of the hook and a sinker that might be attached thereto (not shown), or if the hook is in the form of a lure, the weight of the lure. Thus, the fishing rod 20 is shown having a straight orientation. In FIG. 2, a fish 32 has been caught on the hook 26, thus causing the fishing line 22 to be tensioned, and possibly causing the fishing line 22 to unravel from the spool 21. Moreover, the distal end 28 of the fishing rod 20 has been pulled downwardly, thus causing the indicating device 30 to light. Abrupt and vigorous movement of the fish 32 caught on the hook 26 within the water 24 causes the indicating means 30 to turn on and off intermittently, as will be described subsequently.

Reference will now be made to FIG. 3 which shows the indicating device 30 of the present invention securely, yet removably held to the fishing rod 20 near the distal end 28 thereof by way of an elastic member 34, which is preferably a loop of high quality elastic material that resists material degradation due to exposure to light, air, and water. The indicating device 30 may easily be attached to the fishing rod 20 by this means at any position near the distal end 28 of the fishing rod 20, as deemed necessary by the person using the fishing rod 20.

Reference will now be made to FIG. 4 which shows the indicating device 30 of the present invention in greater detail. There is a protective housing 40, which is preferably made of plastic material such as nylon, that generally houses the remaining components of the present invention. The remaining components are inserted through an open end 41 in the protective housing 40, and into a generally hollow interior 42. There is a first datum point 44 towards the first end 45 and a second datum point 46 towards the second end 47. The first and second datum points 44, 46 are only for explanatory purposes and do not necessarily exist as specific physical entities on the indicating device 30. The first and second datum points 44, 46 are chosen such that a first longitudinal axis "L" passes through the first datum point 44 and second datum point 46, and is generally centrally aligned along the hollow interior 42 of the protective housing 40. The purpose of the first datum point 44 and second datum point 46 will be described subsequently.

A slot 43 is defined by a pair of rails 49 and extends generally the length of the protective housing 40 and is used to receive the fishing rod 20 therein, thus allowing the indicating device 30 to be securely attached to the fishing rod 20.

An electrically powered indicating means, preferably an electrically powered source of light such as an LED (light emitting diode) 50, extends outwardly from the second end 47 of the protective housing 40, so as to shine exteriorly to the protective housing 40. The LED 50 is itself securely retained by friction within a holder 52, which is preferably also made of a resilient plastic material such as nylon. The base 51 of the LED 50 is retained within a co-operating recess 53 of the holder 52. The holder 52 is seated within the protective housing 40 extending outwardly from the open end 41 thereof, and is held therein by co-operating annular lips 61 and 63. The lens portion 55 of the LED 50 extends through the opening 57 in the holder 52 and is generally visible from beyond the second end 47 of the protective housing 40.

A first lead 54 and a second lead 56 extend outwardly from the base 51 of the LED 50 and are preferably bent around the inner end 58 of the holder 52. A first exposed portion 60 of the first lead 54 contacts a contact portion 73 of the electrically conductive strip 71 in electrically conductive relation therewith. Electrical contact of a second exposed portion 62 will be discussed subsequently.

The contact portion 73 of the electrically conductive strip 71 is disposed about one-quarter of the way around the open end 41, as can be seen in FIG. 5. The holder 52 can be rotated with respect to the open end 41 of the protective housing 40. In this manner, the first exposed portion 60 of the first lead 54 of the LED 50 wipes across the contact portion 73 of the electrically conductive strip 71 until it passes the end 75 thereof, at which time the first exposed portion 60 of the first lead 54 is no longer in electrically conductive relation with the electrically conductive strip 71. Resultingly, the indicating device 30 is in effect turned off and closing of the mercury tilt switch 80 will not cause activation of the LED 50. The holder 52 must be rotated such that the first exposed portion 60 of the first lead 54 contacts the contact portion 73 of the electrically conductive strip 71 in electrically conductive relation therewith, in order to allow the LED 50 to be activated by closing of the mercury tilt switch 80. The holder 52, first lead 54 and contact portion 73 of the electrically conductive strip 71 act as an ON-OFF switch.

Also retained within the protective housing 40 is an electrical power source in the form of a pair of batteries 70, which are preferably button type batteries. For the sake of illustrative purposes, the batteries 70 will be considered to have a first terminal 72 and a second terminal 74. The first terminal 72 contacts the second exposed portion 62 of the second lead 56 of the LED 50, in electrically conductive relation therewith. The second terminal 74 of the batteries 70 contacts a spring member 76, which biases the batteries 70 toward the second lead 56 of the LED 50, thus ensuring positive electrical contact between the batteries 70 and the second lead 56 of the LED 50.

At the closed end 36 of the hollow interior 42 of the protective housing 40 is a non-positive contact switch means, which is a mercury tilt switch 80. The LED 50, the batteries 70 and the mercury tilt switch 80 are contained seriatim within the interior 42 of the protective housing 40. The mercury tilt switch 80 is for intermittently turning on and off the LED 50, as will be described subsequently.

The mercury tilt switch 80 has a main body portion 81 defining a generally hollow interior 79, and a base 83. A second longitudinal axis "M" passes through the mercury switch 80 and is generally centrally aligned within the hollow interior 79 thereof. The second longitudinal axis "M" is substantially parallel to the longitudinal axis "L" of the protective housing 40, and in the preferred embodiment the two longitudinal axes "L" and "M" are essentially co-extensive. A first terminal 82 is centrally disposed, preferably such that longitudinal axis "M" passes therethrough, at a first end 88 of the mercury tilt switch 80 and extends outwardly from the base 83. This first terminal 82 is physically seated within a recess 37 within the first end 45 of the protective housing 40. A second terminal 84 is disposed generally around the periphery of the generally hollow interior 79. A mercury bead 86 is retained within the generally hollow interior 79 of the main body portion 81 of the mercury tilt switch 80 and is free to move around therein. The mercury bead 86 is a terminal bridge member that is adapted to contact the first and second terminals 82, 84 to thereby connect the first and second terminals 82, 84 in electrically conductive relation with one another. The distance between the first terminal 82 and the second terminal 84 is considerably less than the size of the mercury bead 86. In the preferred embodiment the distance between the first terminal 82 and the second terminal 84, and the size of the mercury bead 86 are such that the mercury bead 86 makes contact with the first terminal 82 when the second longitudinal axis "M" is about 7° form horizontal, with the first end 88 lower than the second end 89. This angle of 7° is known as the actuation angle. The mercury bead 86 can move within the generally hollow interior 79 of the mercury tilt switch 80 in a direction that is at least in part perpendicular to the second longitudinal axis "M". The mercury bead 86 alternatingly connects the first and second terminals 82, 84 in electrically conductive relation with each other and subsequently breaks the connection, when the mercury tilt switch 80 is subjected to abrupt vigorous movement that is at least in part perpendicular to the second longitudinal axis "M". As the mercury bead 86 moves within the main body portion 81 it intermittently contacts the second terminal 84 and the internal end 87 of the first terminal 82.

In order to electrically close the mercury tilt switch 80, which by definition means to make the first terminal 82 and the second terminal 84 in electrically conductive relation with one another through the mercury bead 86, the mercury bead 86 must contact both the internal end 87 of the first terminal 82 and second terminal 84 at the same time. It can be seen that this will occur when the mercury bead 86 is located generally at the vertex between the second terminal 84 and the base 83 of the mercury tilt switch 80.

The first terminal 82 contacts an electrically conductive strip 71 in electrically conductive relation therewith. The electrically conductive strip 71 extends from the first end 45 of the protective housing 40 toward the open end 41 of the protective housing 40 and terminates in a contact portion 73, which contacts the first lead 54 of the LED 50 in electrically conductive relation therewith.

The spring member 76 receives the main body portion 81 of the mercury tilt switch 80 therein. The outer casing of the main body portion 81 forms a second terminal 84. The spring member 76 contacts the second terminal 84 in electrically conductive relation therewith.

The mercury tilt switch 80 is connected in series with the electrical power source, the batteries 70, and with the electrically powered indicating means, the LED 50. The batteries 70, the LED 50, and the mercury tilt switch 80 are in a complete series circuit, which also includes the spring member 76 and the electrically conductive strip 71. The LED is energized by the batteries 70 when the mercury tilt switch 80 is closed.

It can be seen that the mercury tilt switch 80 becomes closed when the mercury bead 86 contacts the second terminal 84 and the internal end 87 of the first terminal 82 at the same time. This occurs when the indicating device 30 is tilted such that the first datum point 44 is lower, with respect to horizontal, than the second datum point 46. It can further be seen that when the first datum point 44 is higher, with respect to horizontal, than the second datum point 46, the mercury bead 86 cannot contact the internal end 87 of the first terminal 82 and resultingly the indicating device 30 cannot turn on.

The mercury tilt switch 80 employed in the present invention has a mercury bead 86 therein that is substantially smaller than the internal end 87 of the mercury tilt switch 80. Thus, the mercury bead 86 can move freely around the internal end 87 of the mercury tilt switch 80. In doing so the mercury bead 86 sometimes is in contact with the second terminal 84 and sometimes is not in contact with the second terminal 84. The mercury bead 86 is, however, generally in contact with the first terminal 82 when the internal end 87 of the mercury tilt switch 80 is oriented substantially fully downwardly. In order for the mercury tilt switch 80 to be electrically closed, the mercury bead 86 must be in electrical contact with both the first terminal 82 and the second terminal 84 simultaneously. Due to the generally flat shape of the internal end 87 of the mercury tilt switch 80, it is very difficult for the mercury bead 86 to remain over the centrally disposed first terminal 82 only and not to touch the peripherally disposed second terminal 84. Resultingly, the mercury tilt switch is closed almost certainly some of the time, typically most of the time, when the internal end 87 is oriented substantially fully downwardly. However, it can be seen that when the internal end 87 of the mercury tilt switch 80 is oriented substantially fully downwardly and the mercury tilt switch 80 is jostled or moved abruptly, the mercury bead 86 moves into and out of contact with the second terminal 84, and perhaps the first terminal 82, to thereby cause the mercury tilt switch 80 to be electrically closed only part of the time. Positive continuous contact between the mercury bead 86 and the first and second terminals 82, 84 is not ensured—indeed, it is virtually guaranteed that no such contact will occur. Thus, in the present context, the term "non-positive" indicates that the mercury bead 86 makes contact with both of the first terminal 82 and the second terminal 84 just part of the time that the internal end 87 is oriented substantially fully downwardly, and that full positive contact is not ensured.

In the case of a common ordinary mercury switch, orienting the mercury switch such that the mercury bead falls to the contact end of the switch causes the mercury bead to be in electrical contact with both of the contacts, thus electrically closing the switch. If the mercury switch is jostled or otherwise moved, while remaining substantially in the same angular orientation, the mercury bead remains in positive electrical contact with both of the contacts. Thus, the mercury switch remains electrically closed.

The functioning of the indicating device 30 of the present invention will now be described with reference to FIGS. 6 and 7, which show the fishing rod 20 and fishing line 22 thereof, with the fishing line 22 being tensioned by a fish. In FIG. 6, the distal end 28 of the fishing rod 20 has been pulled downwardly by the tension on the fishing line 22. This typically occurs when a fish is nibbling at the hook on the line 22 or has been first caught on the hook. In either case, the indicating device 30 becomes tilted downwardly and oriented such that the first datum point 44 is lower, with respect to horizontal, than the second datum point 46. In this orientation, the mercury bead 86 contacts the second terminal 84 and the internal end 87 of the first terminal 82, thus closing the mercury tilt switch 80 and turning on the LED 50.

Figure 7:
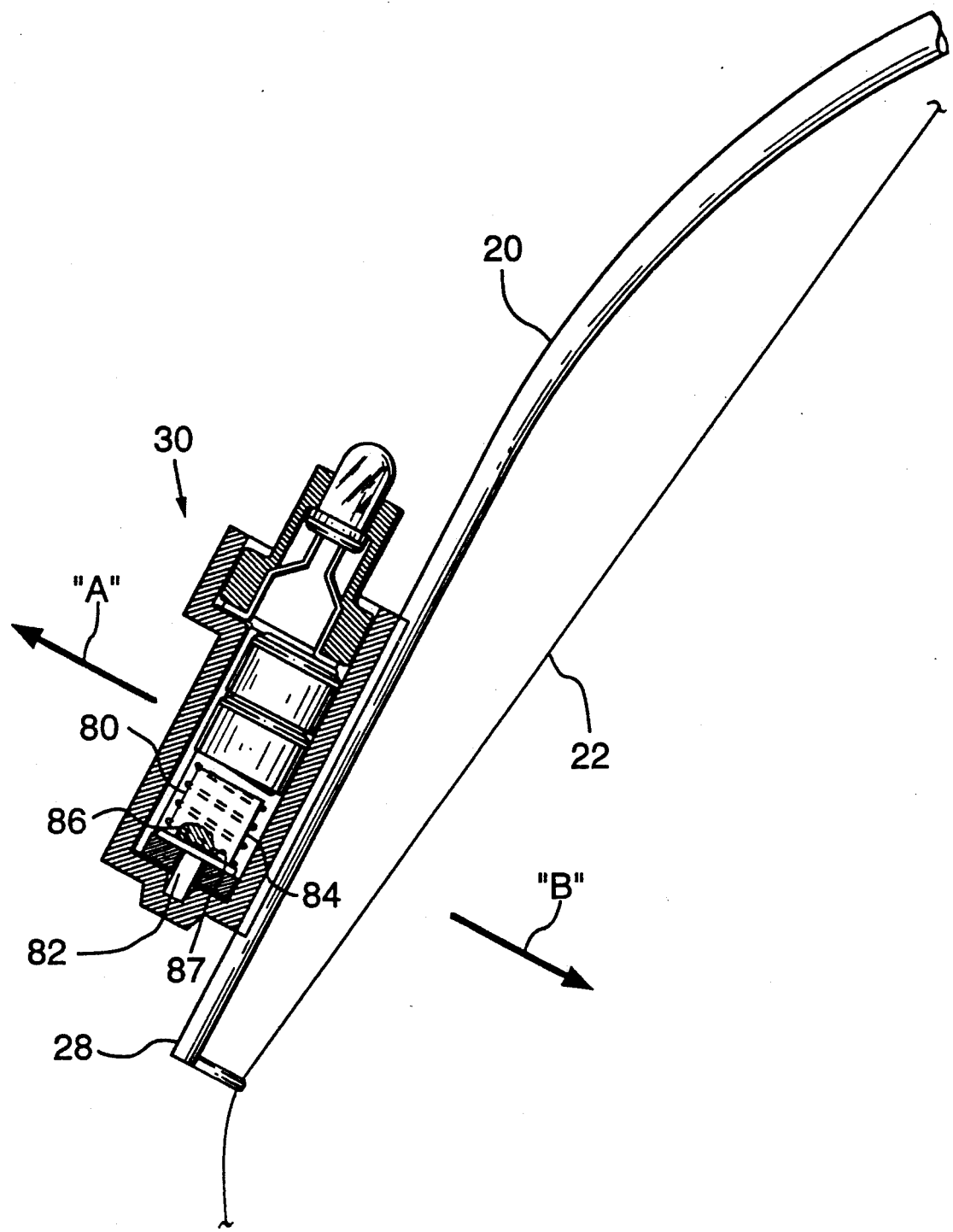
FIG. 7 is an enlarged pictorial side view of the fishing rod and indicating device as shown in FIG. 6, with the end of the fishing rod having been moved abruptly and vigorously so as to cause a change in the position of the mercury bead within the mercury switch.

In FIG. 7, the fish has been caught on the hook, and is now causing abrupt vigorous movement of the fishing line 22 and correspondingly causing abrupt vigorous movement of the indicating device 30. Resultingly, the mercury bead 86 in the mercury tilt switch 80 travels around within the main body portion 81 thereof. Such travel of the mercury bead 86 within the main body portion 81 causes intermittent contact by the mercury bead 86 with both the second terminal 84 and the internal end 87 of the first terminal 82 of the mercury tilt switch 80. The mercury bead 86 is usually contacting at least one of the second terminal 84 or internal end 87 of the first terminal 82, but only intermittently contacts both the second terminal 84 and internal end 87 of the first terminal 82 at the same time. Resultingly, the mercury tilt switch 80 is closed only intermittently, which in turn causes the LED 50 to be turned on in a corresponding intermittent manner. In this manner, the indicating device 30 indicates differently for a fish nibbling at the hook 26 of the fishing line 22 and a fish that has been fully caught on the hook 26 of the fishing line 22.

In an alternative embodiment, as shown in FIG. 8, the indicating device 90 comprises an electrically powered sound generating device such as a buzzer 92 as the electrically powered indicating means. The buzzer 92 might be desirable if a person finds that he does not tend to look at the indicating means frequently enough, or alternatively if the person using the fishing rod is vision impaired. The other components of the indicating device 90 are similar or identical to those of the indicating device 30 as described in the preferred embodiment.

In use, the fishing rod 20 maybe held at virtually any angle desired by the person fishing. It must be kept in mind, however, that the actuation angle, which is 7° in the preferred embodiment as described, is measured with respect to horizontal. The angle the fishing pole is held at will therefore affect the amount the distal end 28 of the fishing rod 20 must be bent downwardly by the force of the fish 32 caught on the hook 26 in order for the mercury tilt switch 80 to become initially closed. It can be seen that the suspected weight and strength of the type of fish being sought might affect the angle that the fishing rod 20 is initially held at. Alternatively, the angle of mounting of the indicating device 30 on the fishing rod 20 may be set as desired by interposing an angled mounting means, such as a small block of wood or plastic, between the indicating device 30 and the fishing rod 20. In an alternative embodiment of the present invention, it is contemplated that an adjustable angle mounting member could be included for mounting the indicating device 20 at any one of a variety of angles with respect to the fishing rod 20.

The mercury tilt switch 80 could be replaced, for example, with a reed or a magnetic reed switch, or a microswitch, where in any event the operation is as a non-positive contact switch show actuation is controlled by movement beyond an actuation angle, or by a predetermined jostling force.

Other modifications and alterations may be used in the design and manufacture of the indicating device of the present invention without departing from the spirit and scope of the accompanying claims.

What is claimed is:

1. An electrically powered indicating device for use in conjunction with a fishing rod to indicate movement of a portion of the fishing rod, said device comprising:
   means for mounting said device on a fishing rod;
   a protective housing having a generally hollow interior, a first datum point, a second datum point, and a first longitudinal axis passing through said first and second datum points;
   an electrical power source having a first terminal and a second terminal, said electrical power source being securely retained within said interior of said protective housing;
   an electrically powered indicating means securely retained by said protective housing, said indicating means having a first lead and a second lead;
   a non-positive contact switch means electrically connected in series with said electrical power source and said electrically powered indicating means for turning on and off said electrically powered indicating means, wherein said non-positive contact switch means has a generally hollow interior defined, in part, by a base at a first end, and a generally peripherally disposed main body portion with a second longitudinal axis generally centrally aligned within said hollow interior, said base being generally perpendicular to said second longitudinal axis; a first terminal centrally located on said base and a second terminal located on said main body portion and disposed in adjacent and peripheral relation to said base, and a terminal bridge member of nominal size less than the inside diameter of the main body portion adapted to contact said first and second terminals so as to thereby connect said first and second terminals in electrically conductive relation with each other;
   wherein said electrical power source, said electrically powered indicating means, and said switch means are in a complete electrical circuit, and said electrically powered indicating means is energized by said electrical power source when said switch means is closed;
   wherein said non-positive contact switch means initially becomes closed when said device is oriented such that said first datum point is lower than said second datum point; and
   wherein, subsequently to said non-positive contact switch means becoming initially closed, movement of said terminal bridge member within said hollow interior of said non-positive contact switch means occurs generally across said base in such a manner so as to alternatingly make and break contact with said second terminal and thereby correspondingly intermittently connect said first and second terminals in electrically conductive relation with each other such that said non-positive contact switch means becomes correspondingly opened and closed intermittently.

2. The device of claim 1, wherein said non-positive contact switch means is a mercury tilt switch.

3. The device of claim 2, wherein said electrical power source is a battery.

4. The device of claim 3, wherein said device contains said battery and said mercury tilt switch in said interior thereof.

5. The device of claim 5, wherein said device is generally elongated and contains said battery and said mercury tilt switch physically displaced in seriatim in the interior thereof.

6. The device of claim 5, wherein said battery is a button-type battery.

7. The device of claim 6, further comprising a spring member situated in interposed relation between said second terminal of said non-positive contact switch means and said second terminal of said battery so as to connect said second terminal of said non-positive contact switch means and said second terminal of said battery in electrically conductive relation to each other.

8. The device of claim 7, wherein said indicating means is positioned in seriatim with said battery and said mercury switch.

9. The device of claim 8, wherein said device is substantially one and one-half inches long and substantially one-half inch in diameter.

10. The device of claim 9, wherein said protective housing is made of plastic.

11. The device of claim 1, wherein said protective housing is adapted for direct attachment to the rod portion of a fishing rod by way of a cooperating slot in said protective housing.

12. The device of claim 1, wherein said indicator means is an electrically powered source of light.

13. The device of claim 12, wherein said electrically powered source of light is a light emitting diode.

14. The device of claim 13, wherein said light emitting diode shines exteriorly to said protective housing.

15. The device of claim 1, wherein said indicating means is an electrically powered sound generating device.

16. The device of claim 15, wherein said sound generating device is a buzzer.

* * * * *